United States Patent [19]

Dirks et al.

[11] 3,906,036

[45] Sept. 16, 1975

[54] REDUCTION OF CHLORIDE CONTENT IN OLEFIN DERIVATIVES SUCH AS VINYL ACETATE

[75] Inventors: Jerald E. Dirks, Corpus Christi; Glenn E. Organ, Bay City, both of Tex.

[73] Assignee: Celanese Corporation, New York, N.Y.

[22] Filed: Mar. 25, 1968

[21] Appl. No.: 715,511

[52] U.S. Cl............................. 260/497 R; 252/413
[51] Int. Cl.$^2$......................................... C07C 67/05
[58] Field of Search.. 252/413; 260/497 A, 604 AC, 260/597 B, 410.9 N

[56] References Cited
UNITED STATES PATENTS

| | | | |
|---|---|---|---|
| 3,420,873 | 1/1969 | Olivier................................ | 260/497 |
| 3,463,740 | 8/1969 | Ketley et al........................ | 260/497 |

*Primary Examiner*—Vivian Garner
*Attorney, Agent, or Firm*—Ralph M. Pritchett

[57] ABSTRACT

In a process for producing a derivative such as vinyl acetate from an olefin such as ethylene in the presence of a catalyst comprising a noble metal ion, an alkali metal acetate, and a redox agent comprising a copper (II) salt, in the course of which a portion of the copper (II) is deactivated by side reactions in which it is converted to copper oxalate which is then regenerated to an active form by treatment with hydrochloric acid at an elevated temperature, the treated liquid containing the regenerated catalyst tends to contain volatile organic chlorides (e.g. chloroform) which, upon recycle to the olefin reaction zone, tend to contaminate the product (e.g. vinyl acetate). Removal of these impurities from vinyl acetate by distillation is difficult if not impossible when a very high purity vinyl acetate is desired. The invention consists of removing these volatile chlorides, by vaporization processes, from the regenerated catalyst-containing liquid before it is returned to the olefin reaction zone. In a particular embodiment, the vaporization comprises stripping with a fixed gas containing molecular oxygen, whereby the catalyst is returned in a highly oxidized state to the olefin reaction zone.

10 Claims, No Drawings

REDUCTION OF CHLORIDE CONTENT IN OLEFIN DERIVATIVES SUCH AS VINYL ACETATE

THE INVENTION

This invention relates to processes for the conversion of alkenes to their useful oxygenated derivatives by processes wherein an alkene is oxidized by being contacted, in a liquid reaction medium, with a catalyst comprising ions of a noble metal, such as palladium, together with an alkali metal acetate and a redox agent comprising a copper (II) salt. More particularly it relates to a process in which vinyl acetate is produced from ethylene by bubbling ethylene and a gas comprising molecular oxygen into a liquid reaction medium comprising the above-identified catalyst in acetic acid. More particularly it relates to a method for improving the quality of the vinyl acetate produced by said process. Specifically it relates to a method for maintaining in said vinyl acetate process reaction conditions under which the product vinyl acetate will meet rigid quality specifications in the matter of organic chloride content.

The conversion of olefins, particularly alkenes, to useful organic derivatives, including the conversion of ethylene to vinyl acetate, by oxidation in a primary olefin reaction zone with a nobel metal salt and a redox agent, including specifically palladium salts and copper chloride, is discussed in a number of patents including U.S. Pat. No. 3,260,739, British Pat. No. 964,001, and Belgain Pat. No. 614,970. The details of these processes are not pertinent to the present invention except that, in the production of ethylene derivatives such as vinyl acetate and ethylene and ethylidene glycol acetates in the presence of a catalyst which comprises copper, undesirable side reactions occur in which a portion of the copper is continuously converted to copper oxalate. This copper oxalate is insoluble in the reaction medium (e.g. acetic acid), with the result that the reaction medium tends toward a condition in which its copper content is present in the form of suspended solid copper oxalate particles which are catalytically inactive. Because of this such processes, to be commercially practicable, commonly include a catalyst reactivation step which comprises withdrawing from the primary reaction zone, continuously or intermittently, a portion of the liquid reaction medium containing the copper oxalate and subjecting it to a suitable chemical treatment whereby the oxalate moiety is removed, e.g. by decomposition to, for example, carbon oxides. It will be understood that the term "liquid" reaction medium as used herein includes suspensions of solids, e.g. copper oxalate and/or cuprous chloride, in the liquid reaction medium and that after the chemical treatment the treated liquid can also be a suspension, e.g. of cuprous chloride, rather than a clear solution A particular mode of catalyst regeneration which has been found to be effective and commercially useful is described in U.S. patent application Ser. No. 556,905, filed June 13, 1966. This catalyst reactivation or regeneration process comprises withdrawing from the primary reaction zone, in which ethylene is contacted with the catalyst under oxidizing conditions, a portion of the liquid reaction medium, containing a suspension of copper oxalate, adding to this withdrawn portion a mineral acid comprising partially or entirely hydrochloric acid, and subjecting the resulting mixture to conditions of elevated temperature at which the copper oxalate is decomposed and the copper content is obtained in a form (copper chloride) suitable for recycle to the vinyl acetate reaction zone.

Application of the regeneration process described in the afore-mentioned application Ser. No. 556,905 to a vinyl acetate-producing process results in the recovery from that process of a vinyl acetate product which is generally satisfactory for most purposes but which tends to contain volatile organic chlorides in an amount which may make it of borderline quality when very stringent quality standards are being applied. Ideally, vinyl acetate, when employed in the most demanding uses, should not contain any organic chloride at all, or at any rate the chloride content should be below or not much above, the detectable limits. For example, the chloride content, computed as chloride, should be not greater than 5 ppm as determined by combustion followed by spectrophotometric analysis for silver chloride.

The problem of contamination of vinyl acetate by organic chlorides is complicated by the fact that chloroform in particular is difficult or impossible to remove from vinyl acetate distillation, especially to the degree necessary for producing a highly purified product. This discovery is surprising, since the boiling point of chlororform is sufficiently different from that of vinyl acetate that it would be expected that ordinary distillation methods could effect a clean and complete separation of the two. The exact reason for this refractory behavior is not known, although it may involve the existence of a hitherto-unknown azeotrope. In any event, it has been found that chloroform in particular, once admixed with vinyl acetate, is extremely difficult to separate from it by the ordinary methods known in the art. In other words, vinyl acetate which has once been contaminated with chloroform cannot thereafter, as a practical matter, be purified sufficiently to meet the highest quality specifications which are demanded for certain end uses.

It is an object of the present invention to provide an improved method for preventing contamination by volatile chlorides, particularly chloroform, in an olefin derivative which is produced by a process in which an olefin, such as an alkene, is converted to the derivative by contacting it with an olefin oxidation catalyst comprising noble metal ions and a copper (II) redox agent, when the reaction is one in which the redox agent tends to be deactivated by conversion to copper oxalate which is then regenerated to an active form by decomposing the oxalate moiety in the presence of hydrochloric acid. It is another object to provide an improved vinyl acetate production process whereby the vinyl acetate product will be sufficiently pure to meet all commercial specifications. It is a specific object to provide a method for preventing chloroform contamination of vinyl acetate produced by the catalytic conversion of ethylene in the presence of a reaction medium comprising palladium ions, lithium acetate, and cupric chloride in acetic acid. Other objects of the invention will be apparent from the following detailed description and examples.

In accordance with the present invention the regenerated catalyst-containing liquid, after treatment with hydrochloric acid and heating to an elevated temperature (e.g. 150°–200°C) whereby oxalic acid is decomposed, is subjected, before being recycled to the primary olefin reaction zone in which it is employed as the catalyst, to a vaporization process whereby a light ends fraction, comprising particularly chloroform, is separated therefrom and withdrawn from further readmixture into the, for example, vinyl acetate primary reaction system. It has been discovered that, when this light ends fraction is removed at this point in the process, there is no appreciable contamination of the vinyl acetate by chloroform. That is, in the primary reaction zone in which the alkene (e.g. ethylene) is converted to its derivatives (e.g. vinyl acetate) the generation of chloroform is not a problem. Other chlorides than chloroform, which still may be formed in the primary reaction zone, are separable from vinyl acetate by conventional distillation methods. It is believed, although it is not intended to limit the scope of the invention in accordance with this interpretation, that the chloroform is formed in the catalyst regeneration zone where organic compounds are subjected to the action of cupric chloride at elevated temperature. By stripping light ends from the regenerated catalyst solution, which has been found to be easily accomplished, chloroform and any other volatile compounds formed in the regeneration reaction can be removed from the system with surprising ease and efficiency. It will be immediately recognized that the invention is not restricted to vinyl acetate processes, although it has its greatest applicability here since vinyl acetate is unusually hard to separate from chloroform.

In practicing the invention any vaporization process can be employed in separating the light ends fraction from the regenerated catalyst liquid after it has been treated with hydrochloric acid and heated. For example, a simple single-stage distillation can be employed to remove a distillate fraction comprising light ends. Specifically, simply distilling out approximately 5% of the treated catalyst-containing liquid in a single stage has been found adequate. Single stage distillation, of course, allows some loss of acetic acid overhead in the distillate, so that distillation with more than one vapor-liquid contacting stage, as in distillation through a batch column or a continuous multiple-stage column, is somewhat more efficient. Also, stripping processes (i.e. vaporization processes in which there is little rectification but in which there is at least one stripping stage) are also effective. The stripping can be carried out either in a multiple-stage operation in which the liquid being stripped is caused to flow downward through one or more vapor-liquid contacting trays or through a packed column against a rising stream of a stripping medium; or, in a very simple and effective embodiment, the stripping can comprise simply a single-stage "blow" of the liquid with a fixed gas. The single-stage blowing is actually a preferred embodiment of the invention, since it is easily carried out and surprisingly effective.

In addition to distillation and fixed-gas stripping, it will be recognized that other equivalent vaporization processes can be employed as will be apparent to those skilled in the art. For example, the liquid to be stripped of its volatile chloride components can be fed into the top, or near the top, of a bubble-tray column provided with a reboiler at its base, the stripping medium then being vapors (e.g. of acetic acid) generated by the reboiler and rising upwardly through the column. Alternatively, the stripping medium can be vapors of a liquid which is chemically inert toward acetic acid (e.g. a hydrocarbon) and which has a boiling point intermediate between that of acetic acid and the light ends being stripped. Such intermediate-boiling liquids when employed in this manner are sometimes referred to as "chasers".

In summary, the heart of the invention is the removal of the volatile fraction by any suitable vaporization process before the treated catalyst liquid is returned to the primary reactor in which the alkene such as, for example, ethylene, is being catalytically converted to a derivative such as, for example, vinyl acetate.

The thoroughness of the stripping operation required for effectively preventing chloride contamination of the alkene derivative produced in the primary reaction zone will depend upon various factors including (a) the amount of oxalate in the catalyst solution being treated, (b) the temperature and pressure of the stripping system, and (c) the number of countercurrent stages employed in the stripping if it comprises other than a single-stage system. For example, in a single-stage vaporization satisfactory results have been obtained when, at atmospheric pressure, approximately 5% of a hydrochloric acid treated catalyst solution comprising palladium and copper catalyst species was removed as distillate. It will be apparent to those skilled in the art that by employing countercurrent vaporization processes, such as multiple-stage distillation with rectification, the fraction taken overhead as distillate can be smaller while still accomplishing the same degree of removal of chloroform. Likewise, distillation under vacuum normally increases the relative volatility of the compounds being separated and so allows the attainment of the same degree of separation with a reduced quantity of total distillate.

Whatever mode of vaporization is employed, the amount of stripping to be employed in a given system (that is a given combination of olefin reaction system, catalyst solution draw-off rate, and catalyst regeneration system) can be determined by designing the stripping system to satisfy either or both of two controlling process parameters. The first and more basically important of these is the organic chloride content of the olefin derivative being ultimately recovered from the primary reaction zone (e.g. vinyl acetate). If the organic chloride content of this olefin derivative ultimately recovered from whatever purification process is being employed in conjunction with the primary reaction system is greater than the set specification limit (typically 5 ppm or even less), then the intensity of the stripping operation should be increased. That is, the quantity of the treated catalyst liquid removed therefrom as distillate should be increased and/or the number of stripping stages should be increased (if the stripping operation entails multiple-stage stripping). The other control parameter is the organic chloride content of the stripped catalyst solution. Preferably this stripped solution should contain no more than about 5 ppm organic chloride, a requirement which can be met without difficulty and which will suffice in almost all instances; chloride concentration up to about 15 ppm can be tolerated in many instances. Intensity of the stripping should be increased if this parameter is not satisfied. It will be recognized that less intensive stripping can be employed if desired, if the olefin derivative being produced is one in which some perceptible quantity of organic chloride can be tolerated. The organic chloride content specification of the olefin derivative (e.g. vinyl acetate) is the prime process control analysis to be used in controlling the vaporization process of the present invention.

It is recommended that all components boiling below about 80°C be removed in the vaporization operation.

When the vaporization process being employed comprises stripping the treated catalyst solution with a fixed gas, it becomes feasible to employ a particularly preferred embodiment of the invention. This is to employ as stripping medium a gas which comprises molecular oxygen, the inclusion of which in the stripping medium aids in maintaining the catalyst in the oxidized form in which it is most suitable for introduction into the primary reaction zone. It is not essential that this be done, the regeneration procedure of application Ser. No. 556,905 yielding a catalyst of adequate activity, but the inclusion of oxygen in the stripping medium has been found to assure that activity will be not only adequate but maximal. The quantity of oxygen to be employed is not critical, although preferably the oxygen added should be at least stoichiometrically enough to oxidize all the palladium in the catalyst liquid being treated from $Pd^0$ to $Pd^{2+}$ and all the copper from $Cu^+$ to $Cu^{2+}$. Air can be employed as the stripping medium when the liquid being stripped comprises predominantly acetic acid, and oxygen concentrations down to about 2 to 5 volume percent in the stripping medium are quite effective in maintaining a high state of catalyst oxidation. The only upper limit on oxygen concentration in the stripping medium is that imposed by safety considerations. That is, the oxygen concentration should be kept below that at which, in the presence of the liquid being stripped (e.g. acetic acid) an explosive condition could prevail. Explosive limits for various combustible materials in the presence of oxygen-containing gases are generally known, and can be referred to in establishing pertinent oxygen-concentration control limits for the stripping system being employed.

The temperature to be employed in the vaporization operation is not critical, but it has been found advantageous to control it within certain limits, or rather below a certain upper limit, in order to prevent undue corrosion of the stripping apparatus and also to prevent further copper chloride-induced chlorination reactions which will form additional chloroform if the temperature is allowed to rise above a certain maximum. These chlorination reactions also interfere with the air oxidation of the copper I to copper II in those embodiments of the invention in which air is employed as stripping medium (the chlorination reactions being faster than the air oxidation reactions at high temperatures). These undesirable temperature effects are pronounced at 170°C. At 120°C they do not interfere unduly and the process of the invention employing air stripping is feasible. At about 100°C to 110°C the undesired side reactions are no problem and the temperature is still high enough to promote rapid stripping. Below 100°C it is necessary only to take care that enough stripping is applied to remove enough chloroform to satisfy the control parameters discussed hereinabove.

When an inert gas stripping medium is being employed in a onestage stripping system, it is preferred to operate with not more than about 10 standard cubic feet of stripping medium per cubic foot of liquid being stripped when the stripping temperature is greater than about 100°C. The reason for this is that at higher temperatures, while the process is still operable, losses of acetic acid into the vapor leaving the stripper begin to be appreciable, with the result that some additional processing, such as partial condensation of the vapors, becomes desirable in order to recover this vaporized acetic acid. At lower temperatures, however, or at stripping rates below about 10 standard cubic feet per cubic foot of liquid, such partial condensation can be dispensed with and the resulting process is of a very attractive simplicity. When multiple countercurrent stripping stages are employed, of course, these considerations become less controlling since, for example, vapor losses can be controlled by operating the top stage or stages at somewhat reduced temperatures whereby some rectification is effected.

The following examples are given in order to illustrate the invention further.

EXAMPLE I

From the reaction zone of a reactor in which ethylene was being converted to vinyl acetate by being injected, together with oxygen, into a liquid phase comprising acetic acid containing a catalyst comprising palladium ions, copper (II) chloride ions, and lithium acetate, a continuous draw-off stream of the liquid reaction medium was taken for the purpose of regenerating suspended copper oxalate, which was continually being formed in the reaction zone and was present in the liquid reaction medium in an amount of about 160,000 ppm. Regeneration of the copper oxalate (i.e. coversion of its copper content to copper chloride) was accomplished by continuously introducing the drawn-off liquid into a catalyst regeneration zone wherein it was mixed with about 0.3 part by weight of 37% aqueous hydrochloric acid per part drawn-off liquid, after which the mixture was heated to approximately to 170°C for about 10 minutes under a total pressure of approximately 300 psig for the purpose of decomposing the oxalate content. The regenerated catalyst liquid contained about 150 ppm of organic chlroides, calculated as chloroform. Approximately 0.1 lb of oxalate-containing catalyst liquid was withdrawn from the vinyl acetate reactor for regeneration in the manner just described per pound of vinyl acetate produced in the reaction system. The regenerated catalyst liquid was continuously returned to the vinyl acetate reactor for reuse.

With the vinyl acetate reactor and the catalyst regeneration system operating in the above-described manner and with the regenerated catalyst liquid being returned to the vinyl acetate reactor as described, the vinyl acetate as ultimately recovered from the reaction system and purified by conventional methods (i.e. extensive distillation combined with chemical treatment to remove aldehydic contaminant) contained about 15 ppm chloride calculated as chloroform. The chloride content of the finished vinyl acetate varied somewhat between a maximum as high as 75 ppm and a minimum as low as 8 ppm. Generally, however, the chloride content ranged between about 10 ppm and 30 ppm.

EXAMPLE II

The vinyl acetate reactor and purification system were identical with those described in Example I. The rate and mode of withdrawal of the oxalate-containing liquid for regeneration were substantially the same as in Example I. The oxalate content of the withdrawn liquid, and the manner of treatment with hydrochloric acid, were as in Example I.

After completion of the catalyst regeneration operation, the regenerated catalyst liquid was continuously cooled to approximately 110°C and then continuously fed at about 7000 lb per hour into the upper portion of a stripper, operated at substantially atmospheric pressure, which comprised a vertical cylindrical vessel 1 foot in diameter and provided near its bottom with an internal sparger through which nitrogen was continuously injected at 1500 to 2000 standard cubic feet per hour (scfh). The liquid level in the stripper was maintained about 4 feet above the sparger. A discharge duct was provided for vapors leaving the top of the sparger, discharging into a noxious gas-collecting system the details of which are outside the scope of the present invention. Stripped liquid was continuously withdrawn from the bottom of the stripper and returned to the vinyl acetate reactor.

The stripped catalyst solution withdrawn from the stripper and recylced to the vinyl acetate reactor contained less than 10 ppm of organic chloride calculated as chloroform. Normally the stripped catalyst solution contained less than about 3 ppm organic chlroide.

With the stripper in operation as described above and with the stripped catalyst solution being continuously returned to the vinyl acetate reactor, the chloroform content of the recovered, purified vinyl acetate product ranged from a trace to a maximum of about 5 ppm, typically less than 1 ppm.

EXAMPLE III

The same vinyl acetate reaction system, catalyst regeneration system, and catalyst stripper employed in Example II were employed. All operating conditions and chemical compositions in the catalyst regeneration system were substantially as in Example II, but the ratio of stripping medium to regenerated catalyst solution being stripped was modified. Typically, per cubic foot of regenerated catalyst solution introduced into the catalyst stripper there were introduced approximately 0.15 cubic foot of a stripping gas comprising about 2% oxygen and the remainder nitrogen.

The stripped catalyst solution withdrawn from the stripper contained approximately 1 ppm to 5 ppm of chloroform. The finished vinyl acetate contained not more than 5 ppm chloroform, usually 1 ppm or less.

EXAMPLE IV

A treated catalyst solution substantially identical with that employed as feed to the stripper in the foregoing examples was stripped with nitrogen at approximately 100°C, approximately 10 cubic feet of nitrogen being employed per cubic ft of liquid being stripped and the nitrogen being sparged into the liquid at a point approximately 4 ft below the surface. Stripping pressure was substantially atmospheric. The stripped liquid contained approximately 1 to 5 ppm of chloroform and was in all respects suitable for use as reaction medium in the production of vinyl acetate from ethylene.

EXAMPLE V

A sample of regenerated catalyst liquid containing palladium, lithium acetate, and copper chloride in acetic acid substantially as employed in the preceding examples and having a chloroform content of approximately 150 ppm was charged into a simple batch still comprising a pot equipped with a heating element and also having means attached to the vapor space of the pot for withdrawing and collecting the evolved vapors. There were no fractionating trays; that is, the distillation was a single-stage distillation. Operating the still at atmospheric pressure, approximately 5% of the initial liquid charge was distilled overhead. Analysis of the residue (i.e. 95% of the intitial charge) revealed that it contained 10 ppm of chloroform. It was suitable for employment in the vinyl acetate process as catalyst liquid.

In the same still, and also at atmospheric pressure, removal of 10% of the charge as distillate gave a residue product containing about 3 ppm chloroform; removing 10% as distillate resulted in a stripped residue containing 3 ppm chloroform.

In another run, approximately 6% of a charge containing initially 38 ppm of chloroform was removed as distillate as described above. The residue contained 4 ppm of chloroform and was suitable for use as catalyst liquid in producing high-purity vinyl acetate.

It will be recognized that the foregoing examples are given merely by way of illustration and that the invention includes within its scope many variations in the vaporization process employed and in the composition of the catalyst solution being treated. The invention is applicable to any system in which chloroform is a by-product of the catalyst regeneration operation and in which the catalyst solution comprises a liquid from which chloroform is separable by vaporization methods.

The embodiment of the invention in which an exclusive property or privilege is claimed are defined as follows:

1. In a process for producing vinyl acetate by contacting ethylene and a gas comprising molecular oxygen, in an olefin reaction zone, with an essentially non-aqueous liquid reaction medium comprising acetic acid containing a noble metal ion catalyst, an alkali metal acetate and a redox agent comprising a copper (II) salt, in which process at least a portion of said copper (II) salt is converted to copper (II) oxalate and in which process the catalyst is regenerated by a process comprising withdrawing a portion of said liquid reaction medium containing copper (II) oxalate from said olefin reaction zone, treating said portion of liquid reaction medium with hydrochloric acid and heating whereby the copper (II) oxalate content of said portion of liquid reaction medium is converted to (a) soluble copper salts and (b) decomposition products of oxalic acid, the improvement which comprises:
  a. after said treatment with hydrochloric acid and heating, separating said portion of liquid reaction medium, by a vaporization process at a temperature below 170°C, into a light ends fraction comprising chloroform and a stripped residue substantially free from chloroform, and
  b. recycling said stipped residue to said olefin reaction zone,
  whereby chloroform and related volatile organic chlorides formed in said catalyst regeneration process are kept from contaminating said vinyl acetate.

2. The improved process of claim 1 wherein the vaporization process is distillation.

3. The improved process of claim 2 wherein the light ends fraction comprises substantially all of the components of said portion of liquid which boil below about 80°C at atmospheric pressure.

4. The improved process of claim 1 wherein the vaporization process comprises stripping said portion of liquid reaction medium with a stripping agent in the vapor phase, said stripping agent being acetic acid, or a hydrocarbon having a boiling point intermediate between that of acetic acid and the light ends being stripped, or a fixed gas selected from the group consisting of inert gases, air, and oxygen.

5. The improved process of claim 4 wherein the stripping agent is a fixed gas.

6. The improved process of claim 5 wherein said stripping comprises blowing said portion of liquid reaction medium with said fixed gas in a single stripping stage.

7. The improved process of claim 6 wherein said blowing is conducted at substantially atmospheric pressure.

8. The improved process of claim 7 wherein said blowing is carried out at about atmospheric pressure and at a temperature below about 100°C.

9. The improved process of claim 7 wherein said blowing is carried out at about atmospheric pressure, at a temperature between about 100°C and 120°C and the blowing rate, defined as standard cubic feet of stripping agent employed per cubic feet of said portion of liquid being stripped, is controlled below about 10.

10. The improved process of claim 5 wherein said fixed gas contains molecular oxygen in an amount up to but not including that at which an explosive concentration of oxygen can occur within the zone in which said stripping is conducted.

* * * * *